United States Patent
Huang et al.

(10) Patent No.: US 7,773,512 B2
(45) Date of Patent: Aug. 10, 2010

(54) BANDWIDTH CONTROL MODULE AND BANDWIDTH CONTROL METHOD THEREOF

(75) Inventors: Mao-Lin Huang, HsinChu (TW); Yi-Lun Chen, HsinChu (TW); Jin-Ru Chen, HsinChu (TW)

(73) Assignee: Realtek Semiconductor Corporation (TW)

( * ) Notice: Subject to any disclaimer, the term of this patent is extended or adjusted under 35 U.S.C. 154(b) by 196 days.

(21) Appl. No.: 12/070,198

(22) Filed: Feb. 15, 2008

(65) Prior Publication Data
US 2008/0198750 A1 Aug. 21, 2008

(30) Foreign Application Priority Data
Feb. 16, 2007 (TW) .............................. 96106144 A (51) Int. Cl.
H04L 12/54 (2006.01)
H04L 12/26 (2006.01)
G08C 15/00 (2006.01)
(52) U.S. Cl. .................... 370/230; 370/235; 370/412
(58) Field of Classification Search ............... None
See application file for complete search history.

(56) References Cited
U.S. PATENT DOCUMENTS

| | | | | |
|---|---|---|---|---|
| 6,424,622 B1* | 7/2002 | Fan et al. | ........ | 370/230 |
| 6,473,432 B1* | 10/2002 | Nishimura et al. | ........ | 370/412 |
| 6,851,008 B2* | 2/2005 | Hao | ........ | 710/305 |
| 6,967,921 B1* | 11/2005 | Levy et al. | ........ | 370/230.1 |
| 7,164,687 B2* | 1/2007 | Namihira | ........ | 370/412 |
| 7,286,485 B1* | 10/2007 | Ouellette et al. | ........ | 370/252 |
| 7,369,520 B2* | 5/2008 | Luoma et al. | ........ | 370/312 |
| 7,489,828 B2* | 2/2009 | Asad et al. | ........ | 382/254 |

* cited by examiner

*Primary Examiner*—Chi H Pham
*Assistant Examiner*—Soon-Dong D Hyun
(74) *Attorney, Agent, or Firm*—Schwegman, Lundberg & Woessner, P.A.

(57) ABSTRACT

A bandwidth control method is adapted for use in a network device having a system clock. The network device has a register for storing a transmittable data amount to control bandwidth. The method includes: calculating a number of elapsed periods of the system clock so as to change a counting value every predetermined time interval, the counting value being cyclic within a specific range; adjusting the transmittable data amount in the register by a first unit amount when the counting value reaches a first count value; and adjusting the transmittable data amount in the register by a second unit amount after adjusting the transmittable data amount by the first unit amount and elapse of the predetermined time interval and when the counting value corresponds to a second count value. The first count value is different from the second count value, and the first unit amount is different from the second unit amount.

16 Claims, 7 Drawing Sheets

BANDWIDTH CONTROL MODULE AND BANDWIDTH CONTROL METHOD THEREOF

CROSS-REFERENCE TO RELATED APPLICATION

This application claims priority of Taiwanese Application No. 096106144, filed on Feb. 16, 2007.

BACKGROUND OF THE INVENTION

1. Field of the Invention

The invention relates to a control module and a control method thereof, more particularly to a bandwidth control module and a bandwidth control method thereof.

2. Description of the Related Art

A network includes many network devices and connections among the network devices. If each network device outputs a large amount of data at unspecific times to the connections, a large amount of bandwidth of the connections will be occupied, resulting in data congestion. Therefore, different models are available for the network devices to control the bandwidth used thereby.

Figure 1:
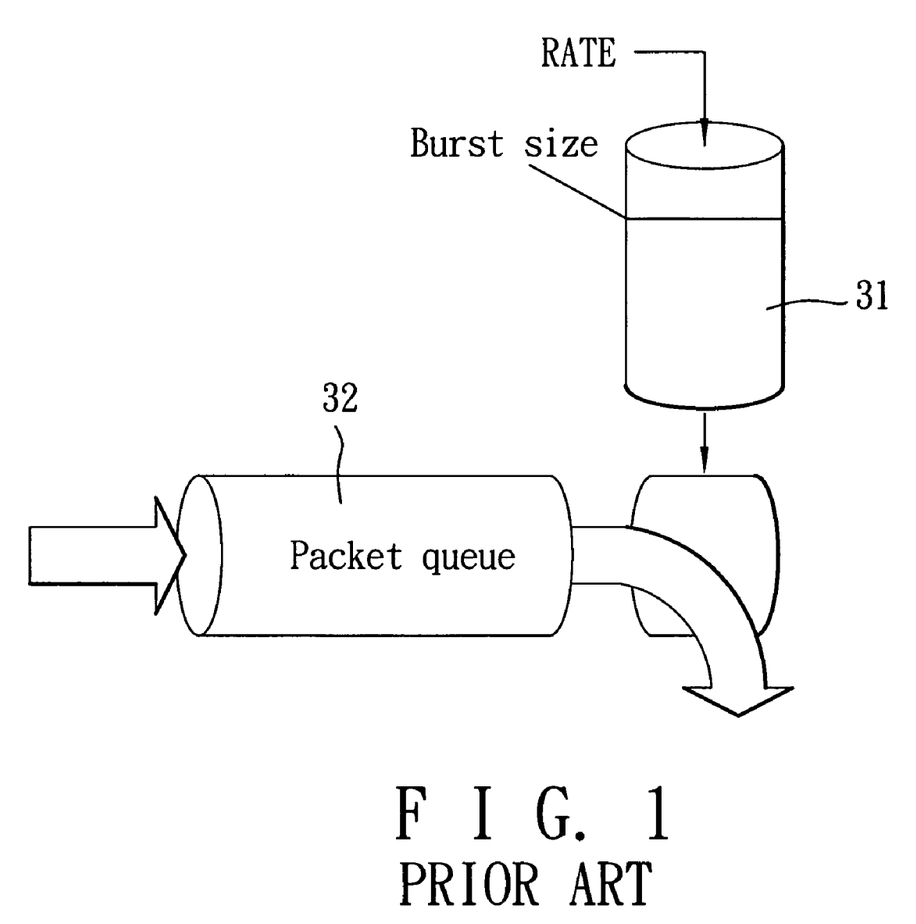
FIG. 1 is a schematic diagram to illustrate a network device using a leaky bucket model to control bandwidth used thereby.

Leaky bucket, or token bucket, is a model used to simulate network bandwidth control so as to shape irregular network flow to a fixed flow rate. FIG. 1 schematically illustrates use of a leaky bucket to simulate network bandwidth control. A leaky bucket 31 stores tokens (not shown). Each token corresponds to a transmittable data amount. A packet queue 32 stores packets (not shown) to be transmitted. The packet queue 32 must first obtain tokens in order to be able to output the packets to be transmitted. This is equivalent to a network device (not shown) that is capable of outputting a data amount corresponding to the tokens. Therefore, by controlling the rate at which the leaky bucket 31 is refilled with the tokens, the network device can adjust the rate of data transmission to thereby control the bandwidth used thereby.

A control parameter RATE represents the rate at which the leaky bucket 31 is refilled with tokens, and corresponds to the data transmission rate (i.e., bandwidth). Burst size represents the maximum number of tokens that can be stored in the leaky bucket 31. When the number of tokens accumulated in the leaky bucket 31 exceeds the burst size, subsequently arriving tokens will be discarded.

Figure 2:
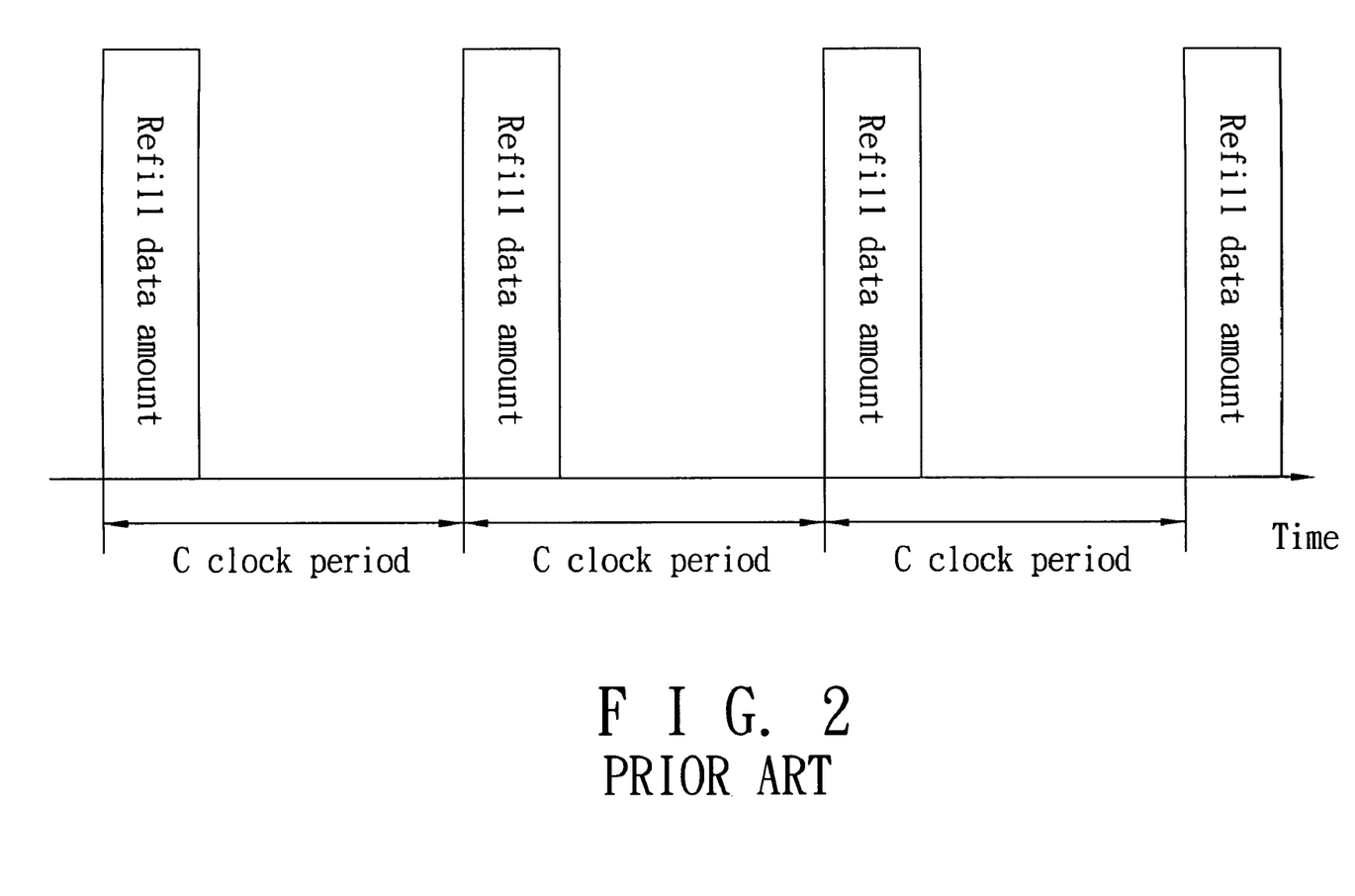
FIG. 2 is a schematic diagram to illustrate how a conventional bandwidth control method is used to distribute data amount of target bandwidth over a time axis.

Referring to FIG. 2, to facilitate processing, in a bandwidth control method conventionally employed by a network device, C clock periods are specified as a time interval according to a system clock with frequency F, and a determined number B of tokens are added as refill every time interval so as to achieve a target bandwidth RATE=F÷C×B, where C and B are integers. For example, if the data that each token corresponds to is 8 bits (1 byte), and the system clock is 75 MHz, 8 tokens (64 bits) are added for refilling every 125 ms of 9375 system clock periods, and the bandwidth R is equal to 512 Kbps.

In the conventional bandwidth control method, B units of data are added as refill every C system clock period. However, given that C and B must be integers, the actually used bandwidth oftentimes cannot be equal to the intended target bandwidth RATE. For example, if the target bandwidth RATE to be set is equal to 832000 bytes per second under the condition that the system clock is 75 MHz, the rate closest to the target bandwidth RATE is 62 bytes every 5589 system clock periods, and the actually used bandwidth will be 831991 bytes per second.

In addition, use of the conventional bandwidth control method will lead to bandwidth instability problems. When the number of system clock periods per time interval is large, the number of tokens required for refilling is large. If there are several packets to be transmitted concurrently at this time, they may be sent out in one batch, thereby creating a burst flow, which makes the bandwidth unstable.

SUMMARY OF THE INVENTION

Therefore, an object of the present invention is to provide a bandwidth control module that can reduce burstiness.

Another object of the present invention is to provide a bandwidth control method that can be used to distribute refill data substantially evenly over a time interval.

Accordingly, the bandwidth control module of the present invention is adapted for use in a network device having a clock signal. The bandwidth control module includes: a register, for storing a data amount to control bandwidth; a counter, for counting the clock signal to generate a counting value, wherein the counting value is cyclic within a predetermined range; and a controller, for controlling the data amount stored in the register according to the counting value, the controller adjusting the data amount stored in the register by a first data amount when the counting value corresponds to a first counting value, and adjusting the data amount stored in the register by a second data amount when the counting value corresponds to a second counting value; wherein the second data amount adjusted by the controller is different from the first d at a amount previously adjusted by the controller.

The bandwidth control method of the present invention is adapted for use in a network having a clock signal. The network device has a register for storing a data amount to control bandwidth. The bandwidth control method includes the following steps:

counting the clock signal to generate a counting value, wherein the counting value is cyclic within a predetermined range;

adjusting the data amount stored in the register by a first data amount when the counting value corresponds to a first counting value; and adjusting the data amount stored in the register by a second data amount when the counting value corresponds to a second counting value;

wherein the first counting value is different from the second counting value; and the first data amount is different from the second data amount.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
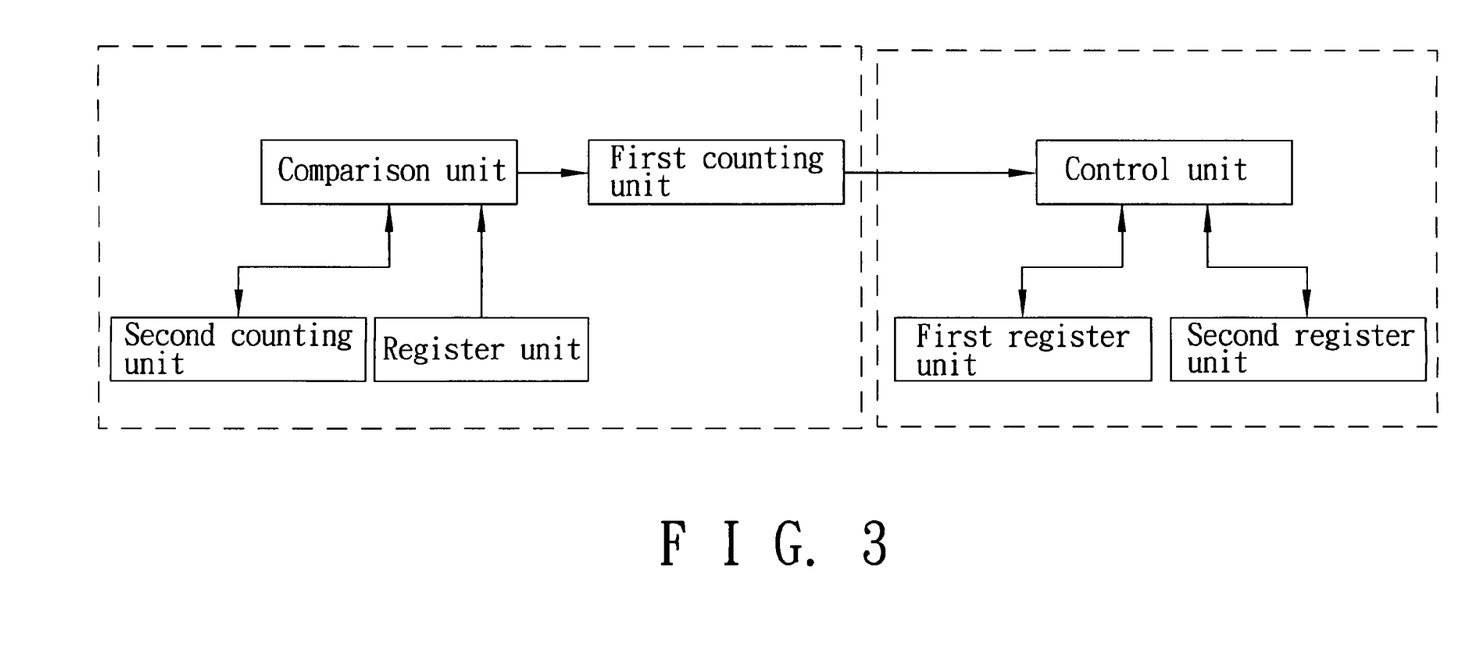
FIG. 3 is a circuit block diagram of an embodiment of a bandwidth control module according to the present invention.
Figure 4:
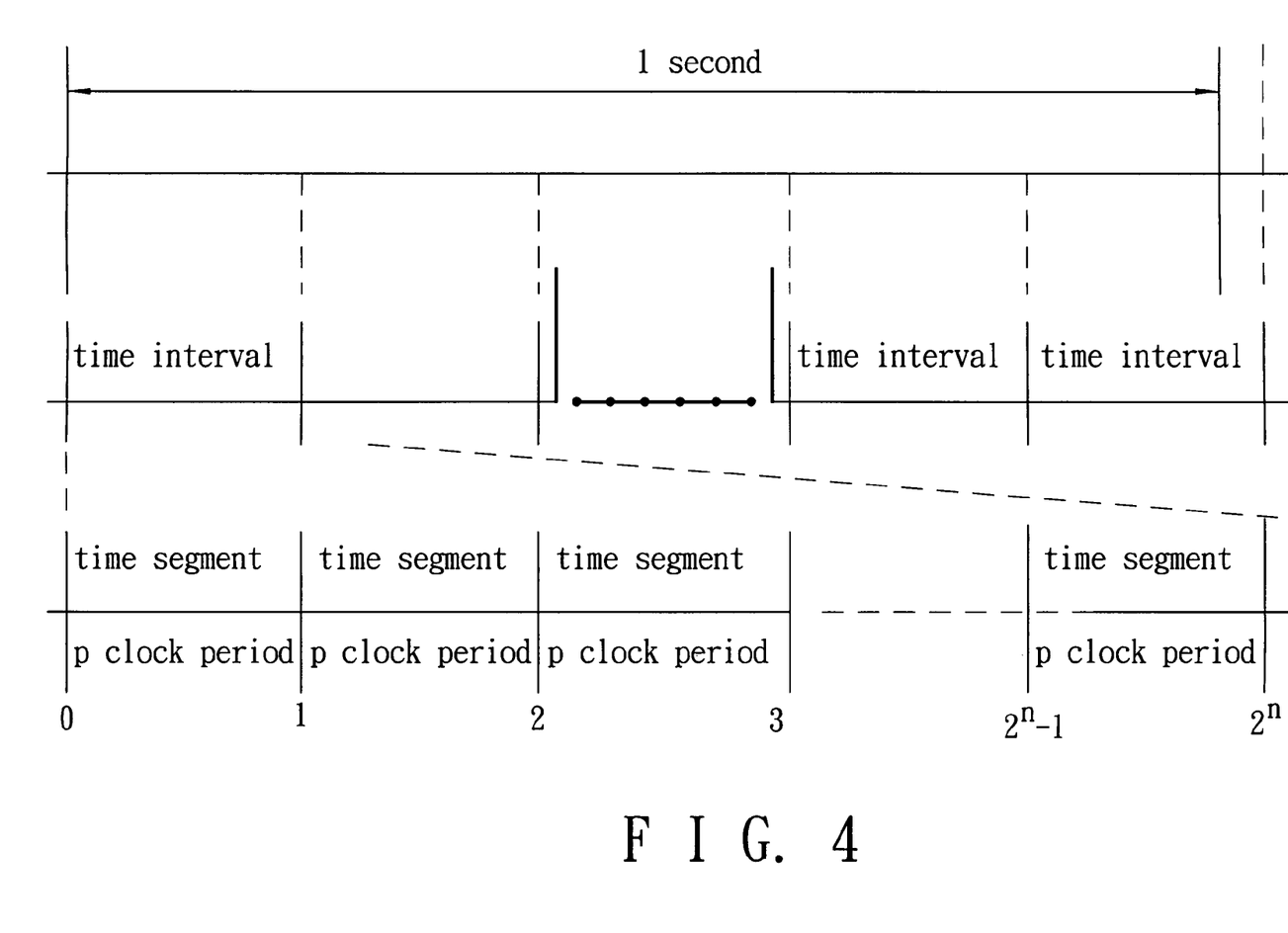
FIG. 4 is a schematic diagram to illustrate how the bandwidth control module of the present invention distributes data amount of target bandwidth over a time axis.

Referring to FIGS. 3 and 4, the preferred embodiment of a bandwidth control module according to the present invention is adapted for use in a network device having a system clock. The bandwidth control module includes a counter 1 and a controller 2. The counter 1 receives a system clock, and outputs a first counting value.

The counter 1 according to one embodiment of the present invention includes a first counting unit 11, a second counting unit 12, a register unit 13, and a comparison unit 14. The comparison unit 14 is electrically connected to the register unit 13, the first counting unit 11, and the second counting unit 12.

The register unit 13 of the counter 1 stores a specified value. The first counting unit 11 outputs the first counting value in binary form. The first counting value is n bits value. Therefore, the value of the first counting value is between 0 and $2^n-1$. The second counting unit 12 calculates elapsed clock periods, and outputs a second counting value equivalent to the number of elapsed clock periods.

The comparison unit 14 determines whether value of the second counting value is equal to the specified value stored in the register unit 13. If yes, the comparison unit 14 controls the first counting unit 11 to add 1 to the first counting value, and further controls the second counting unit 12 to clear the value of the second counting value to 0 so that the value of the second counting value is cyclic within a range from 0 to the specified value.

If the frequency of the system clock is F and the specified value is represented by p, every time a time segment with a time length equal to p clock periods elapses, the value of the first counting value is increased by 1. Since the first counting value is cyclic within the range from 0 to $2^n-1$, every time a time interval with a time length equal to $2^n \times P$ clock periods elapses, the first counting value outputted by the first counting unit 11 would have completed one cycle. Besides, every time interval includes $t=2^n$ time segments. The number of time intervals per second is equal to $T=F \div (2^n \times P)$. Therefore, the number of time intervals per second is determined by the parameters n and p.

The controller 2 includes a first register unit 21, a second register unit 22 and a control unit 23. The control unit 23 is connected electrically to the first counting unit 11 and the register unit 13 of the counter 1, the first register unit 21, and the second register unit 22. The first register unit 21 stores a threshold value. The second register unit 22 stores a transmittable data amount to control network bandwidth.

In the description to follow, the present invention is exemplified to be applied to a network device on Ethernet, and data of one unit is equal to one byte. Moreover, the length of each packet is at least greater than or equal to 64 bytes. Therefore, according to one embodiment of the present invention, refill data for one time segment does not exceed 64 bytes so as to avoid refilling with more than 64 bytes, which may result in simultaneous transmission of two packets. However, the present invention should not be limited thereto.

In each predetermined time segment, amount of data for refilling into the second register unit 22 can be calculated by the control unit 23, and the refill data amount is stored in the second register unit 22. Assuming that the target bandwidth to be controlled is equivalent to RATE in units of byte/second, in order to refill with the same unit(s) of data in each time interval and because the total of time intervals per second is T, an optimum refill data amount S in each time interval is equal to Round(RATE÷T), where Round( ) represents a rounding off operation. If the quotient of S divided by $2^n$ is B and the remainder is R, this means that, of $2^n$ time segments of a time interval, there are R time segments in which the second register unit 22 needs to be refilled with B+1 bytes of data, and there are $2^n-R$ time segments in which the second register unit 22 needs to be refilled with B bytes of data. In this way, the data for refilling each time interval can be equal to S bytes. The actually used bandwidth size is equal to Round(RATE÷T)×T, and an error ratio between the actually used bandwidth size and the target bandwidth is equal to [Round(RATE÷T)×T-RATE]÷RATE. Therefore, when the number of time intervals T is determined, the error ratio can be calculated. Moreover, the higher the target bandwidth RATE, the lower will be the error ratio.

The number of time intervals per second T is determined by the value p in the register unit 13 of the counter 1 and the bit number n of the first counting unit 11. Under the situation that the hardware conditions of the first counting unit 11 are certain, n is a definite value. By setting the size of the value p, the number S of the bytes needed for refilling each time interval can be calculated, and the error ratio can also be determined. Therefore, the control unit 23 can optimize the error ratio by adjusting the value p in the register unit 13 of the counter 1.

For example, if the target bandwidth is RATE=64000 bps (8000 bytes per second), the first counting value is n=14 bits, and the system clock F is 75 MHz, the error ratio can be optimized to −0.617% by setting p=19. In this case, there will be 240.9 ($T=75 \times 10^6 \div (19 \times 2^{14})$) time intervals, and the number S of bytes for refilling each time interval is 33 (S=33=Round(8000÷240.9)). Therefore, of $2^{14}$ time segments in a time interval, there will be 33 time segments in which each is required to be refilled with 1 byte of data. As for the remaining $2^{14}-33$ time segments, there will be refilling with 0 bytes of data. The actually used bandwidth approximates 7950=240.9×33 bytes, and the resulting error ratio is −0.617%.

The control unit 23 receives the first counting value, sets the threshold value, and compares the threshold value with value of the first counting value after bit reversal. If the value of the first counting value after bit reversal is smaller than the threshold value, the control unit 23 needs to refill B+1 bytes of data into the second register unit 22. Otherwise, the control unit 23 refills B bytes of data into the second register unit 22.

In the embodiment of this invention, the control unit 23 utilizes the result of bit reversal to distribute the R time segments evenly over $t=2^n$ time segments of a time interval, but should not be limited thereto. The R time segments may also be distributed over $t=2^n$ time segments of a time interval in other manners.

Since the first counting value has a total of n bits, the $k^{th}$ bit value (k=1~n) of the value of the first counting value after bit reversal by the control unit 23 is the $(n-k+1)^{th}$ bit value thereof before bit reversal.

The control value 23 sets the threshold value to be equal to R. Therefore, values of the first counting value after bit reversal and to which the R time segments correspond will be smaller than the threshold value R (the first counting value after bit reversal being equal to 0~R−1).

Figure 5:
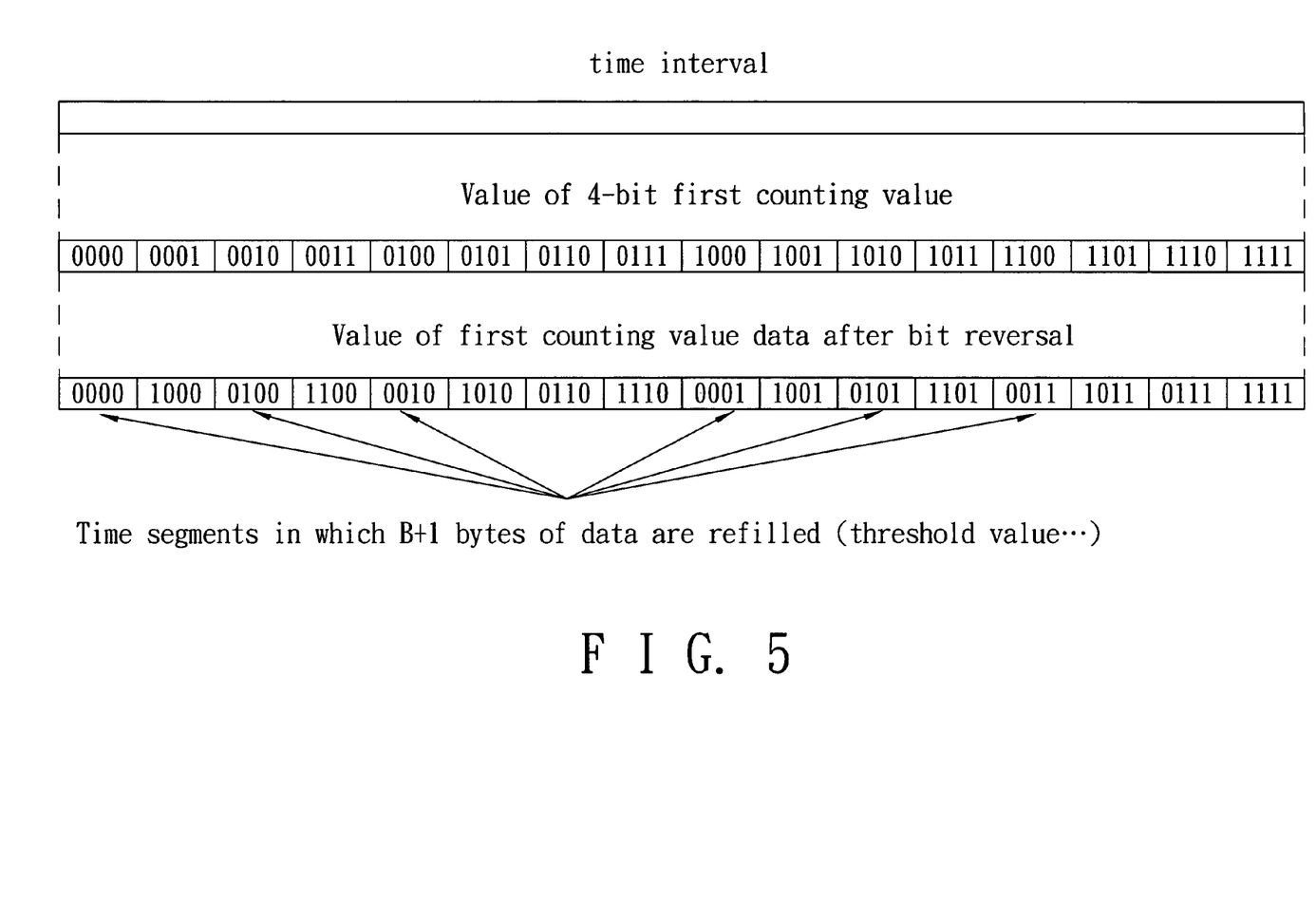
FIG. 5 is a schematic diagram to illustrate that the bandwidth control module of the present invention uses bit reversal to select 6 evenly distributed time segments from 16 time segments of a time interval.
Figure 6:
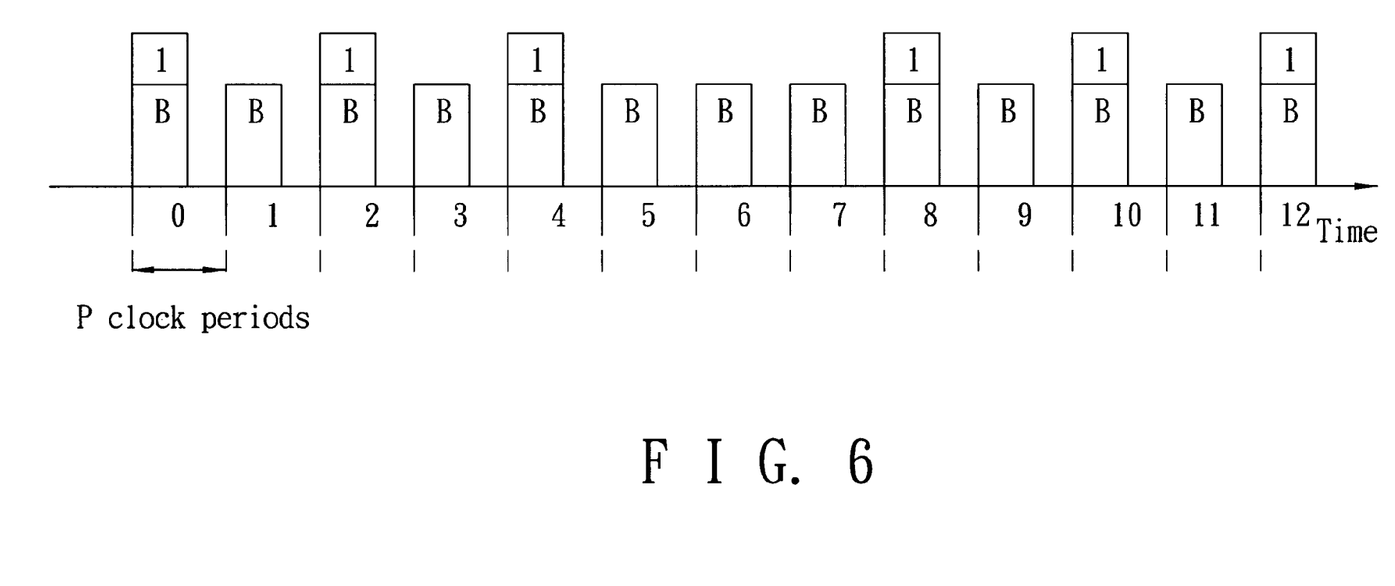
FIG. 6 is a schematic diagram to illustrate how the bandwidth control module of the present invention distributes the data amount of the target bandwidth over the time segments of a time interval.

Referring to FIGS. 5 and 6, supposing the first counting value is 4 bits, and the threshold value is 6, within a time interval, values of the first counting value change from 0000 to 1111 in sequence. Each value represents a time segment. Therefore, a time interval includes 16 time segments, of which there are 6 time segments that are, respectively, 0000, 0010, 0100, 1000, 1010, and 1100. The values thereof after bit reversal are 0000, 0100, 0010, 0001, 0101, and 0011, respectively, and are smaller than the threshold value of 6. The 6 time segments are distributed substantially evenly over the same time interval.

A comparison between FIGS. 2 and 6 reveals that, as opposed to the conventional bandwidth control method in which data for refilling at each time interval is of the same amount (i.e., S bytes), in the bandwidth control method of the present invention, refilling with S bytes of data at each time interval is such that the S bytes of data are distributed evenly over all the time segments of the time interval. Moreover, the amounts of refill data in all the time segments differ at most by only one byte, so that the bandwidth data amount is distributed substantially evenly over all the time segments. Thus, in comparison with the prior art, the present invention can reduce burstiness due to refilling with overly large amounts of data, and can render the bandwidth more stable.

It is noted that, since one time segment can be selected from all the time segments of a time interval for adding 1 byte of data thereto, $T \times 1 = F \div (2^n \times p) \times 1$ can be used as a gradient for increasing the target bandwidth. For example, if the smallest bandwidth is set to be equal to 8000 bytes/second, and a time interval includes 28 time segments, $256=2^8$ can be used as the gradient for increasing the target bandwidth so as to achieve fine tuning of the target bandwidth.

Figure 7:
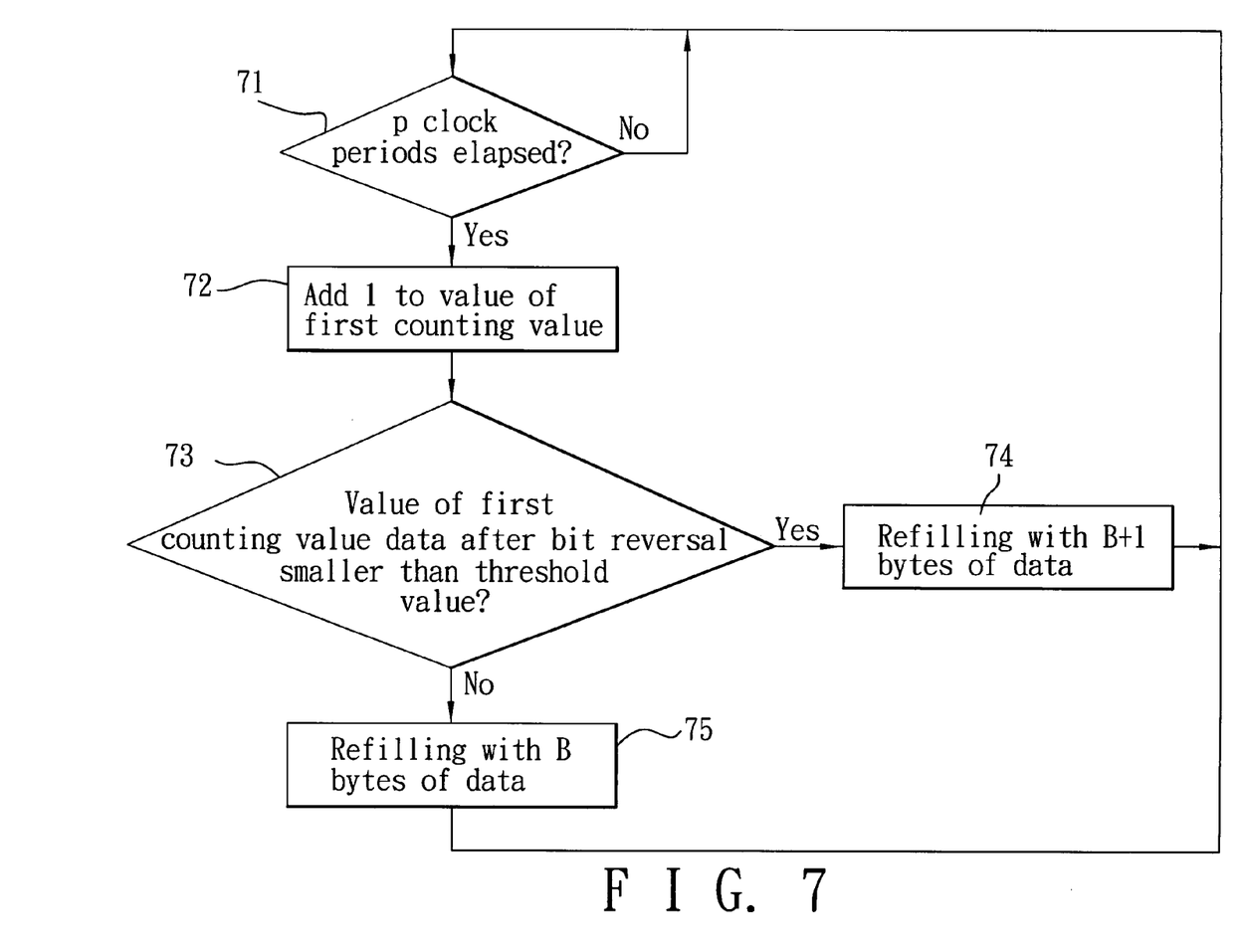
FIG. 7 is a flowchart to illustrate an embodiment of a bandwidth control method according to the present invention.

Referring to FIG. 7, a bandwidth control method employed by the bandwidth control module of the present invention is shown to include the following steps:

In step 71, the second counting unit 12 calculates the elapsed clock periods so as to output the second counting value, and the comparison unit 14 determines whether a specific number of clock periods have elapsed according to the second counting value outputted by the second counting unit 12. If yes, the flow goes to step 72. Otherwise, step 71 is repeated.

In step 72, the comparison unit 14 controls the first counting unit 11 to output the first counting value to the control unit 23 of the controller 2 after adding 1 thereto, and further controls the second counting unit 12 to clear the second counting value to 0.

In step 73, the control unit 23 performs bit reversal on the value of the first counting value, and determines whether the value of the first counting value after bit reversal is smaller than the threshold value. If yes, the flow goes to step 74. Otherwise, the flow skips to step 75.

In step 74, the control unit 23 refills B+1 bytes of data into the second register unit 22. The flow then returns to step 71.

In step 75, the control unit 23 refills B bytes of data into the second register unit 22. The flow then returns to step 71.

In sum, the bandwidth control module of the present invention distributes S bytes of data over all the time segments of a time interval such that the amounts of refill data in the time segments differ by one byte at most, thereby achieving the object of substantially even distribution of the S bytes of data. Compared with the prior art which does not distribute the S bytes of data evenly, the present invention can reduce occurrence of bursty flow.

In addition, the bandwidth control module and the bandwidth control method according the present invention can be applied to a gateway. Moreover, although the present invention is described in connection with the adjustment of bandwidth through adding data of B bytes or B+1 bytes to the second register unit 22 in the above embodiment, in other embodiments, network bandwidth can be adjusted by reducing the amount of data in the second register unit 22. That is, when it is required to adjust the amount of data in the second register unit 22 every time segment, the amount of data in the second register unit 22 is reduced by B bytes of data or by B+1 bytes of data so as to control network bandwidth. The relevant operations are analogous to those described in connection with the above embodiment and will not be repeated herein for the sake of brevity.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A bandwidth control module adapted for a network device having a clock signal, the bandwidth control module comprising:
   a register, for storing a data amount to control bandwidth;
   a counter, for counting the clock signal to generate a counting value, wherein the counting value is cyclic within a predetermined range; and
   a controller, for controlling the data amount stored in the register according to the counting value, the controller adjusting the data amount stored in the register by a first data amount when the counting value corresponds to a first counting value, and adjusting the data amount stored in the register by a second data amount when the counting value corresponds to a second counting value;
   wherein the second data amount adjusted by the controller is different from the first data amount adjusted by the controller.

2. The bandwidth control module of claim 1, wherein the first data amount has one byte different from the second data amount.

3. The bandwidth control module of claim 1, wherein the controller controls the data amount stored in the register by refilling the first data amount into the register when the counting value corresponds to the first counting value and refilling the second data amount into the register when the counting value corresponds to the second counting value.

4. The bandwidth control module of claim 1, wherein the controller controls the data amount stored in the register by reducing the first data amount from the register when the counting value corresponds to the first counting value and reducing the second data amount from the register when the counting value corresponds to the second counting value.

5. The bandwidth control module of claim 1, wherein the counting value is a discontinuous counting value.

6. The bandwidth control module of claim 1, wherein the counting value is a counting value subjected to bit reversal.

7. The bandwidth control module of claim 1, wherein the first counting value is greater than a predetermined threshold value, and the second counting value is smaller than the predetermined threshold value.

8. The bandwidth control module of claim 1, wherein the bandwidth control module is applied to a gateway.

9. A bandwidth control method adapted for a network device having a clock signal, the network device having a register for storing a data amount to control bandwidth, the bandwidth control method comprising the following steps:

counting the clock signal to generate a counting value by a counter, wherein the counting value is cyclic within a predetermined range;

adjusting the data amount stored in the register by a first data amount when the counting value corresponds to a first counting value; and     adjusting the data amount stored in the register by a second data amount when the counting value corresponds to a second counting value;

wherein the first counting value is different from the second counting value; and the first data amount is different from the second data amount.

10. The bandwidth control method of claim 9, wherein the first data amount has one byte different from the second data amount.

11. The bandwidth control method of claim 9, wherein the step of adjusting the data amount stored in the register by a first data amount is refilling the first data amount into the register to adjust the data amount stored in the register; and the step of adjusting the data amount stored in the register by a second data amount is refilling the second data amount into the register to adjust the data amount stored in the register.

12. The bandwidth control method of claim 9, wherein the step of adjusting the data amount stored in the register by a first data amount is reducing the first data amount from the register to adjust the data amount stored in the register; and the step of adjusting the data amount stored in the register by a second data amount is reducing the second data amount from the register to adjust the data amount stored in the register.

13. The bandwidth control method of claim 9, wherein the counting value is a discontinuous counting value.

14. The bandwidth control method of claim 9, wherein the counting value is a counting value processed by bit reversal.

15. The bandwidth control method of claim 9, wherein the first counting value is greater than a predetermined threshold value, and the second counting value is smaller than the predetermined threshold value.

16. The bandwidth control method of claim 9, wherein the bandwidth control method is applied to a gateway.

* * * * *